United States Patent
McRoskey et al.

(10) Patent No.: US 8,894,902 B2
(45) Date of Patent: Nov. 25, 2014

(54) METHOD AND APPARATUS EMPLOYING MODULAR ENGAGEABLE COMPONENTS FOR FORMATION OF MAINTENANCE HOLE PLATFORMS

(75) Inventors: Joseph McRoskey, Carlsbad, CA (US); John W. McRoskey, Carlsbad, CA (US); Gerry Taylor, Carlsbad, CA (US)

(73) Assignee: JMJ Management, LLC, Carlsbad, CA (US)

( * ) Notice: Subject to any disclaimer, the term of this patent is extended or adjusted under 35 U.S.C. 154(b) by 0 days.

(21) Appl. No.: 13/352,322

(22) Filed: Jan. 17, 2012

(65) Prior Publication Data
US 2014/0175698 A1    Jun. 26, 2014

Related U.S. Application Data

(60) Provisional application No. 61/433,486, filed on Jan. 17, 2011.

(51) Int. Cl.
*B29C 51/30*    (2006.01)
*B29C 33/00*    (2006.01)
*B29C 33/30*    (2006.01)
*B29C 41/04*    (2006.01)
*B29C 51/00*    (2006.01)

(52) U.S. Cl.
CPC ............... *B29C 33/00* (2013.01); *B29C 41/04* (2013.01); *B29C 51/00* (2013.01); *B29C 33/301* (2013.01)
USPC ............ 264/219; 264/220; 264/310; 264/319

(58) Field of Classification Search
None
See application file for complete search history.

(56) References Cited

U.S. PATENT DOCUMENTS

| 4,089,139 | A | 5/1978 | Moffa | |
| 6,378,836 | B1 * | 4/2002 | Anthony | 249/114.1 |
| 2004/0040221 | A1 * | 3/2004 | Airheart | 52/20 |
| 2006/0000157 | A1 * | 1/2006 | Karow | 52/103 |

* cited by examiner

*Primary Examiner* — Monica Huson

(57) ABSTRACT

A method for forming a maintenance hole base for the bottom surface of a maintenance shaft using a configurable modular mold and thermoforming or rotational molding. The modular mold is formed of individual members of groups of central core components engageable to surrounding periphery components to yield a mold which will form the appropriate engagement and communication pathways for the base when installed. Polymeric material is employed with the mold to yield a finished component configured for use in the base of the maintenance shaft.

15 Claims, 8 Drawing Sheets

METHOD AND APPARATUS EMPLOYING MODULAR ENGAGEABLE COMPONENTS FOR FORMATION OF MAINTENANCE HOLE PLATFORMS

This application claims priority to U.S. Provisional Patent Application Ser. No. 61/433,486, filed on Jan. 17, 2011 and incorporated herein in its entirety.

BACKGROUND OF THE INVENTION

1. Field of the Invention

The present invention relates to maintenance holes in sewer systems, more commonly known as "manholes." More particularly, it relates to a modular mold device and method of forming and engagement of components thereof providing great adaptability in the configuration of formed components therefrom employed in maintenance holes such as drain junctions, to provide a high degree of modularity and customization to a currently static art employing concrete with few options.

2. Prior Art

Maintenance holes (also known as utility holes, cable chambers, manholes, inspection chambers or access chambers) are employed through the world to provide access for workers and equipment to underground utilities such as sewers and drains or electrical utilities. Conventionally, such maintenance holes generally consist of a concrete shaft rising from a concrete base platform and a metal or plastic hole cover at the entry end of the concrete shaft.

In sewage and drainage systems, the base of the maintenance hole frequently serves as a common juncture or node for the many drain pipelines and conduits which typically network in a sanitary and/or storm sewer or drainage system. The inside of the shaft defining an axial chamber of the hole leading to the base is conventionally outfitted with steps or ladders which lead to the base. These steps, or handholds, allow workers to access the base and the junctions where a plurality of inlet and outlet openings are present. At these junctions, the pipes or conduits of drains communicate through the shaft and couple with the respective inlet and outlet pipes of the sewer systems.

Pipelines of such junction points can either pass through or join into one another in any number of combinations, at any number of angles, and pluralities. This affords the configurations of the bases of maintenance holes in such systems the potential to vary greatly from one base in the system, to another in the system. The respective required connection points and angles of intersection of the bases of maintenance shafts in conventional drainage systems can vary widely with every individual shaft and junction point since it is the angles of the incoming pipes or conduits which determine the configuration of the base.

Conventionally, maintenance hole shafts and bases are made from precast concrete or poured in-place concrete. Due to the nature of concrete, its drying times, and its weight and transportability limitations, the offering of different angles and types of interconnections available is slim. The cost to make, cure, stock and ship heavy precast concrete simply is not adaptable to a high degree of inventory and options being offered. Further, once concrete bases are formed, by the very nature of concrete, they are not easily changed or adapted to allow for any changing angles or new conduits communicating to the base.

With the potential current and future structure of the base varying to such a wide degree, tooling and manufacturing costs as well as functionality for precast concrete elements are also greatly affected. Furthermore, over time concrete being resistant to compaction, is also brittle if support is bent or strained and often requires rehabilitation or replacement due to degradation from earth settling and/or lateral movement caused by such settling or earth movements. Such degradation can also come from corrosive chemicals like sulfides, and in many areas of the country from environmental conditions such as freeze/thaw cycles, and water infiltration. Thus a small crack in a concrete formed base, caused by settling or lateral translation, can turn into a major structural defect when liquid enters the crack and freezes.

In addition to the ongoing potential for degradation of concrete bases, as noted, the precast concrete structures are difficult to transport due to the great weight and bulkiness of dried concrete. This weight and the careful nature in which concrete must be handled when transported to avoid cracking, makes it difficult for concrete formed bases and components to navigate down the narrow constraints of a maintenance hole shaft to the installation point.

All these factors combine in a symbiotic relationship which increases material and labor costs for such systems employing conventional concrete formed components. Additionally, environmental impacts such as increased green house gasses from the production and transport of concrete components themselves, diminish the sustainability of employing concrete over time.

Such serious pitfalls attributable to precast concrete for drain and sewer bases and tunnel liners have been rectified however, with the introduction of rigid plastics for plumbing and sewer and landscaping systems. These plastic counterparts are cost effective, require little to no maintenance, are non-toxic, and being lightweight they are easy to install.

For instance, U.S. Pat. No. 4,089,139 to Moffa et al. teaches a 'segmented cylindrical reinforced plastic manhole structure' adapted to support a conventional manhole cover. Moffa et al. consists of segmented cylindrical structure elements and a base element all cast or molded of reinforced plastic material. The base element however, is merely a cap, with pipeline inlet and outlet openings employed on the vertical face of the bottommost structural segment. With the fixed non-conventional cap-like base more expense must be taken to ensure proper fit and sealing and is overall undesirable.

As such, there is a continuing and unmet need for a device and method which will remedy the downside of employing concrete and similar cured materials for maintenance holes and liners. The need is unmet for both retrofit and new construction of underground utilities which employ maintenance shafts communicating with below-ground junction points such as sewers and drains in a municipal system.

Such a device and method to overcome the shortcomings of current art, should accommodate construction of junction points for drains and sewers in a conventional fashion so that current workers and equipment may be easily employed. However, such a system and device unlike concrete, should allow for a high degree of customization for the size, number, and angles of intersecting drain conduits with the base component formed. Further, such a system should endeavor to provide manufacturers with a high degree of customization ability so as to empower them with the ability to cheaply and easily form the many new and custom configurations of maintenance hole base platforms to decrease labor costs and increase reliability of the formed intersection. Still further, such a device and system should employ lightweight materials for component formation which are easier to ship and easier to install in the narrow underground confines of maintenance shafts to lessen labor costs and improve the structure.

Finally, and most importantly, such a device and system should yield maintenance shafts and bases which are much better at resisting damage from shifts in land and soil supporting it over time.

SUMMARY OF THE INVENTION

The device and modular method allowed by the herein disclosed and described system provides a novel method for the production and variable formation and configuration of such base components for such maintenance shafts. Employing the method of formation herein and the modular components yielded thereby, maintenance shaft bases and their intersections to conduits may be virtually configured, formed using molds assembled of modular mold components, and retrofitted using the formed component from the mold. The formed maintenance shaft bases as such, are highly customizable since they may be formed of a mold using any of a plurality of available engageable components.

Unlike the static nature of formed concrete with few formation and even fewer retrofit options, the disclosed system and device therefrom, allows for the formation of the required and highly customizable base and shaft components using a configurable mold and moldable or thermo formable polymeric materials. Using rotational molding and/or thermoforming, the engageable components making up the formed mold to yield the desired base of a maintenance shaft may be formed with the ability for easy modification if required.

This adaptability provided by thermoforming and rotational molding methods, using modular molds which may first be assembled digitally, provide the user the ability to inexpensively change designs and manufacture multiple engageable finished components for engagement in a plurality of ways, to allow the formation of virtually any configuration and angling of conduit intersections which might be needed in a modern drain or sewer system. Further, through the use of engageable mold components, later retrofitting to accommodate changes in the system intersecting at any given base, is easily achieved by substituting engageable modular components to reshape the mold used to form the desired shape and configuration of the finished formed base to the new requirements.

The system herein can use thermoforming or rotational molding for component formation in a process where a polymeric material is heated to a pliable forming temperature. Once heated, the material is suctioned or otherwise engaged upon a component formed mold to form the specific shape or shapes required. It is then trimmed to create a usable product. The sheet or "film" when referring to thinner gauges and certain material types, is heated in an oven or other means for heating, to a high-enough temperature whereby it can be elevated adjacent to, and stretched into or drawn onto the mold. Once so deposited in or on the mold, the part is quickly cooled to a finished shape of the user configured mold. It can then be removed for interfacing with other components to form a base.

Some or all of the components may also be formed by rotational molding, also known as rotomolding, rotocasting or spin casting. This is a molding process for creating many kinds of mostly hollow items, typically of plastic or polymeric based materials. Using rotational molding, a three motor powered (tri-power) rotational molding or spin casting machine is employed to form the custom components in the well known process of rotational molding. Rotational molding of the components can have advantages over thermoforming in that it can avoid hanging or sagging of the base planar material during the heating phase and also avoid sagging or deformation which can occur during the cooling phase of the formed part.

Some of the components may be better formed using rotational molding and some of the components better formed using thermoforming. The overriding object however is the employment of rotational molding machinery and thermoforming machinery combined with computer aided drawings, and a mold formed of interchangeable components, to form highly customized mold for the formation of maintenance shaft bases and adjacent structure out of light weight, durable, flexible polymeric materials.

Employing a thermoforming or rotational molding or other systems as might occur to those skilled in the art for forming of polymeric-based modular components for the system herein, a maintenance hole base, or hollow segments to form the shaft of the hole itself in a modular adjustable fashion, may be molded out of lightweight and inert polymeric materials including but not limited to plastics such as polyethylene, polystyrene, or polypropylene.

In use, junction points for one or a plurality of incoming and outgoing conduits, may be formed on the configured mold by thermoforming sheets of the plastic material over molds formed to cause the plastic to conform to the mold. Once cooled, the formed piece is usable for a junction point at a maintenance hole base. Alternatively, as noted, the components may be formed using an appropriate rotational molding process.

Using such thermoformed or molded components, which are modular and adapted to engage to each other by removable engagement means, and a CAD engineered virtual formation, molds can easily be assembled for thermoforming, or rotational molding, to yield an infinite number of connection angles, conduit diameters, depths, and other customizable factors lacking in current art.

Individual components, adapted to engage adjacent mold components and form a finished base component with connecting conduits or pathways for conduits in the base, can be removably engaged in any number of configurations to align with any number and configurations of inlet and outlet pipelines of a sewer network entering and leaving a maintenance shaft.

The mold forming components consist generally of a central core hub and engageable periphery core elements providing a plurality of flow passage architectures intended to form a base component adapted to engage in-line in a plurality of configurations to achieve any desired flow paths of communicating inlet and outlet pipelines with the formed base.

The periphery core elements may engage to the central hub by a key and slot system, or any other removably means of engagement adapted for polymeric components and the like. Some periphery elements may employ impressions that produce support mounts on the molded substrate. Mounted supports within the molded base element, are preferably provided to supply added strength and durability to support the lightweight rigid plastic or polymeric materials used.

The molded base component yielded by such customized operations of thermoforming or rotational molding, provides a means to form an infinite number of possible configurations to accommodate existing retrofits of concrete bases or newly designed bases yet to be built. Using a CAD system having a stored library of virtual components formed by the manner herein, the final base or other component may be virtually assembled and tested for compatibility with the measured retrofit installation or the provided new construction criteria.

If new components are required, mold technicians may easily configure thermoform or rotational molds to yield any highly customized final base parts.

Consequently, buyers of the resulting modular mold formed maintenance shaft base components are afforded a major leap forward in the available configurations of such base junction points. As noted, such allows for easy retrofit of old and defunct parts, by providing measurements or photos of excising installations as well as customization for new installations. Using the library of available formed engageable component mold parts, a substitute or new component may be virtually assembled, and then formed in one or a plurality of assembleable components making up the virtual assembly which may be shipped to the user for onsite assembly of the required modular base or shaft component.

With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention.

It is an object of the invention to provide a means to quickly and easily create interfacing mold components for forming maintenance shafts using thermoforming or rotational molding of polymeric materials to yield custom finished components forming a highly customized conduit configuration used for maintenance hole base platforms.

It is another object of the invention to provide such a molded component system which employs a plurality of mold components adapted to engage to each other, to produce a thermoforming or rotational mold for forming a customized maintenance hole base platform.

It is a further object of the invention to provide an infinite plurality of inlet and outlet flow channel configurations in a molded base using adaptively engaged components formed using CAD and rotational or thermoforming.

Still another object of the invention is provision of support mount impressions on the molded component to achieve underlying support mounts for support means on the polymeric molded substrate.

Yet another object of this invention, is the provision of such a highly customizable system of molding which will allow for retrofitting of the infinite number of old, aging components with lightweight long lasting components.

Further objects of the invention will be brought out in the following part of the specification, wherein detailed description is for the purpose of fully disclosing the invention without placing limitations thereon.

BRIEF DESCRIPTION OF DRAWING FIGURES

DETAILED DESCRIPTION OF THE PREFERRED EMBODIMENTS OF THE INVENTION

Figure 1:
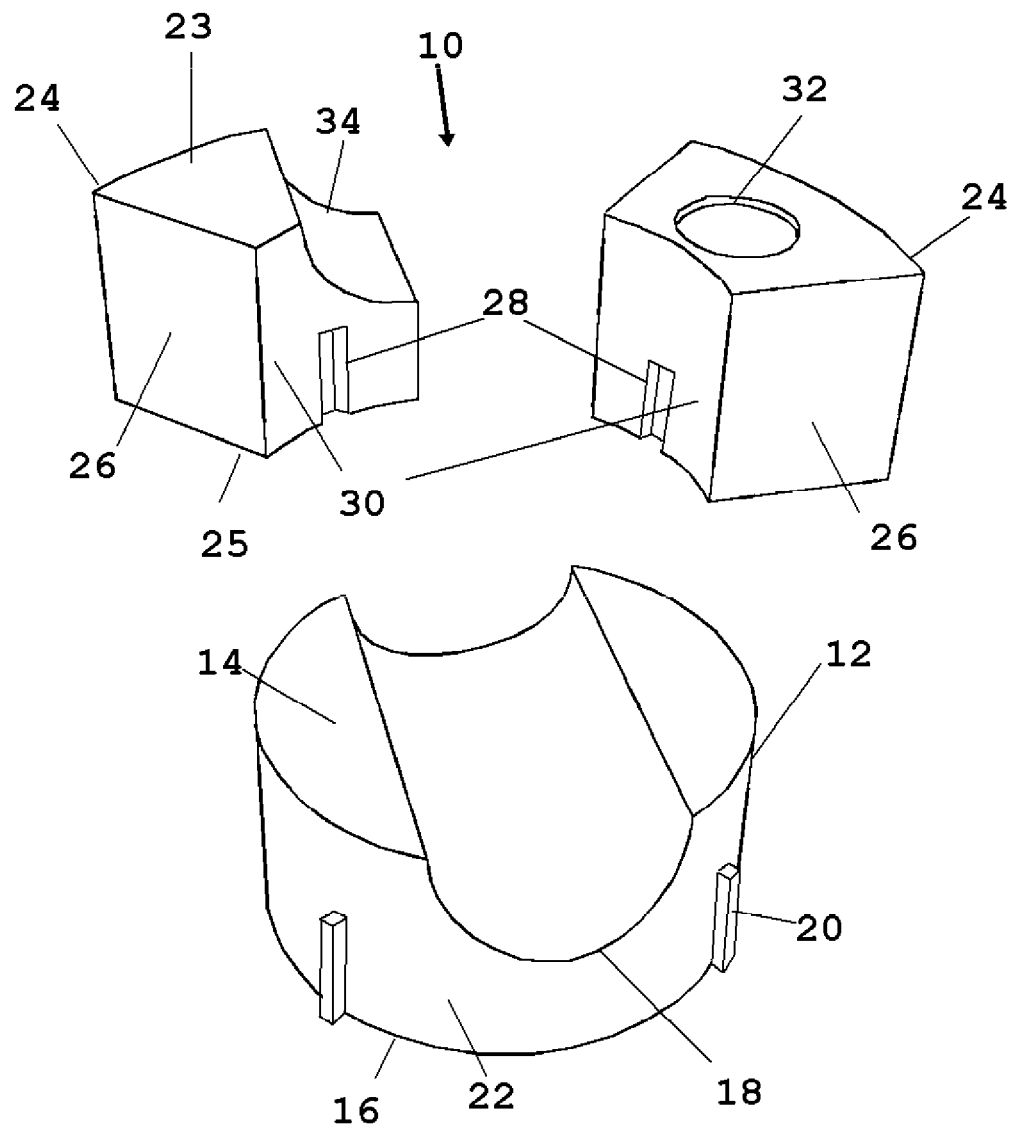
FIG. 1 shows a view of separated mold components formed to engage using polymeric material and molding to yield the core hub and two periphery elements.

Now referring to drawings in FIGS. 1-11, wherein similar components are identified by like reference numerals, those skilled in the art, will realize upon reading this specification, that thermoforming or rotational molding may be accomplished by any number if not an infinite number of designable engageable mold components which may be assembled to yield the molded polymeric part required for a particular installation. As such, any component or part which might be so engaged to yield a thermoform or rotational mold for formation of sewer or drain utility hole junctions and shafts and the like, as would occur to those skilled in the art, are anticipated within the scope of this patent.

In the drawings, there is seen in FIG. 1 a segmented view of the modular formed mold device 10 to yield components using polymeric material heated and drawn thereover. Shown is the center core hub 12 and two of an infinite number of periphery core elements 24 which will engage with the core hub 12 to form different fluid flowpaths at differing angles of ingress and egress to the maintenance shaft. The core hub 12 comprises a substantially circular body forming the core hub 12 and is shown with a surfaced top 14 and an edge intersecting the bottom 16.

The support wall of the body of the core hub 12 is formed by the curved sidewall 22 extending between the edge 15 and the formed top surface 14 configured with a single flow channel 18. Shown is the simplest mode of the core hub 12 which may be employed using the thermoforming or rotational molding herein, with a single straight flow channel 18 formed in the surface of the top 14 communicating at an edge with the sidewalls 22 of the core hub 12.

Engageable periphery elements 24 generally consist of a segmented arc-section elements each with top 23 surfaces communicating with a side edge 26 to a bottom edge 25 at a bottom surface. The interior surface 30 is curved in a shape configured to engaged and abut against the curved surface 22 of the center hub 12. This interior surface 30 also employs a means for removable engagement to the hub 12 to hold it engaged during the molding process but allow removal and storage until needed again. Depicted means for engagement shown in the figure is a slot 28 configured to cooperatively engage with a tab 20 located on the curved surface 22 of the hub 12.

It must be noted that a variety of removable engagement means may be employed the required removable engagement of periphery elements 24 to the hub 12. Any conventional removable engagement as would occur to those skilled in the art, are anticipated, for instance a pin engaging a slot, magnets, removable adhesive, clips on edges 25 and 15, a band around the assembled hub 12 and elements 24, or combinations thereof. The slot and tab system shown is disclosed herein merely for demonstrative purposes and as currently being successfully employed, and should not be considered limiting.

Vertical sidewalls 26 of the periphery elements 24 provide a means to engage and position additional elements 24 abutted to one another. The periphery elements 24 may in an infinite number of arrangements and configurations communicate with incoming or exiting drain or sewer pipes, and employ appropriately positioned channeled surfaces 34 configured and positioned to communicate with one or a plurality of channels formed in the molded component, by the one or a plurality of flow channels 18 positioned on the central hub 12. The periphery elements may also have support mount engagement impression 32.

Figure 2:
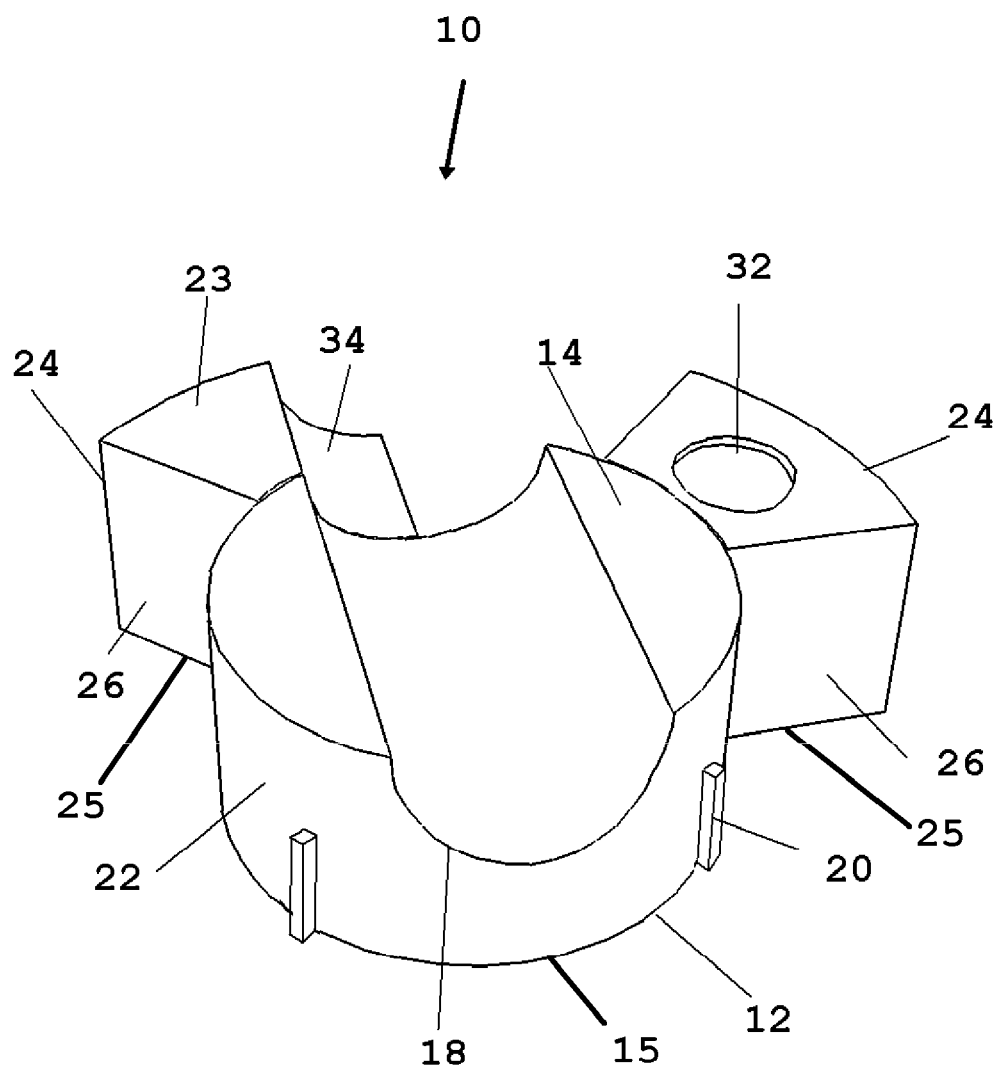
FIG. 2 is a view of two periphery elements of FIG. 1 engaged to the core hub.

FIG. 2 shows a partially full arrangement of the mold forming device 10 having two periphery elements 24 operatively positioned and removably engaged to the central hub 12. A continuous flow channel forming recess is partially formed by communication between the channeled surfaces 34 and 18 of the periphery elements 24 and hub 12, cooperatively positioned in-line with each other.

Figure 3:
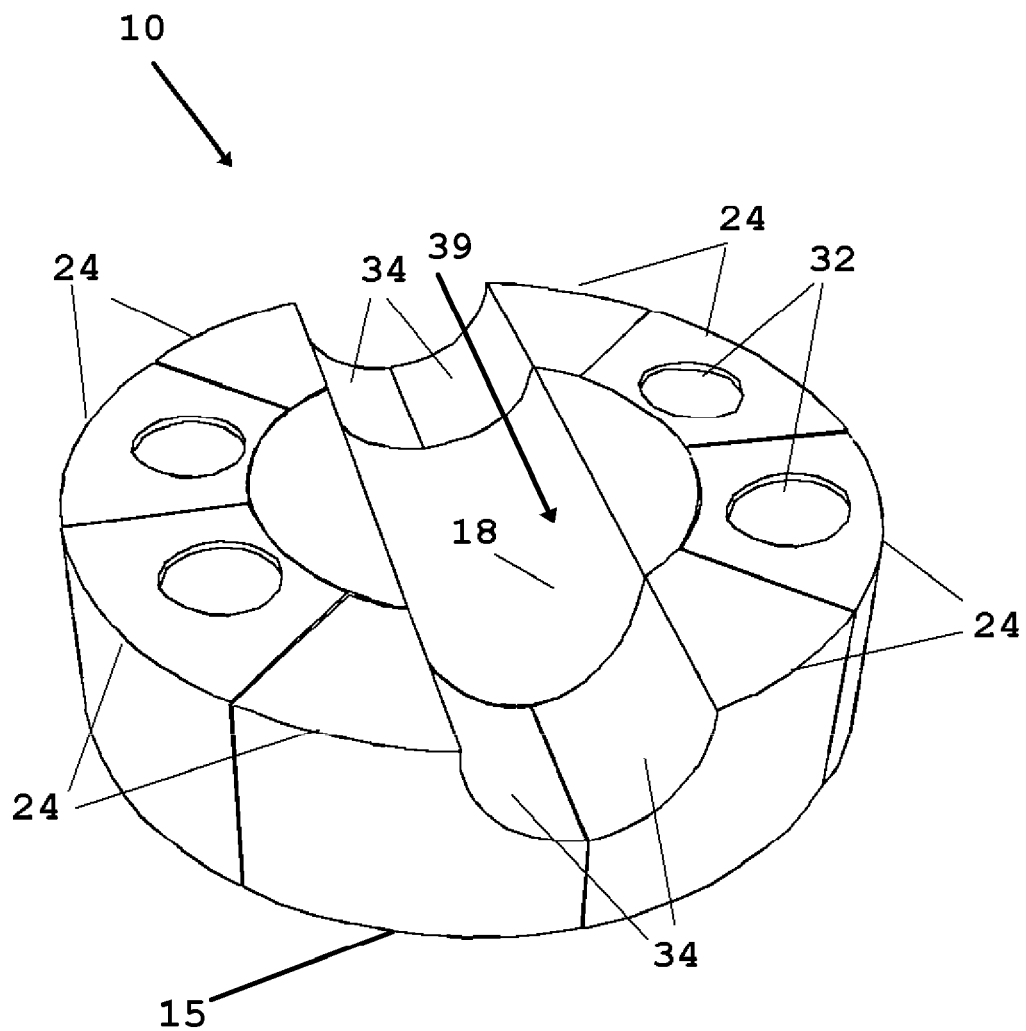
FIG. 3 shows a view of a full assembly of the device in its simplest mode depicting a formed single flow channel for an anticipated central flowpath.
Figure 9:
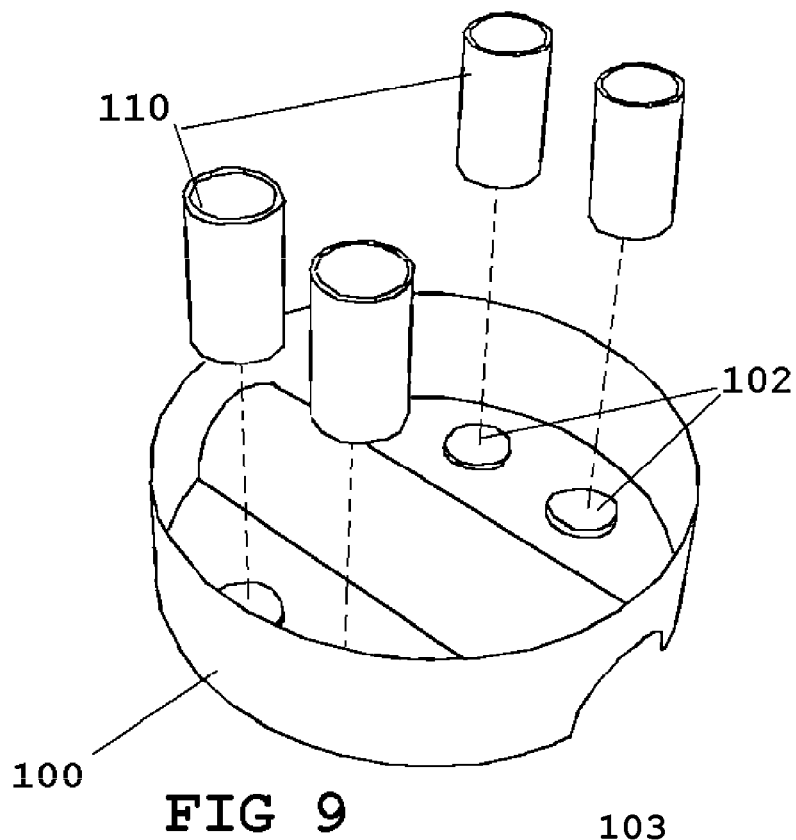
FIG. 9 shows the underside of the formed base component showing the engagement of support elements within the impressions formed therein.

An example of a fully formed arrangement of the interchangeable mold components can be seen in FIG. 3. The periphery elements 24 abut each other and the central hub 12, to complete a thermoforming mold or rotational molding mold configured to yield a finished base for a maintenance hole base platform. Shown in the figure is the simplest channeled mode of the base yielded by the system herein, configured to form a single straight central flow channel 39 which is formed by molding the polymeric material against the channeled surfaces 18,34 of the hub and encircling respective periphery elements 24. It should be noted that any number of properly positioned channeled surfaces 18 and 34 can be positioned in the core 12, and can engaged surrounding periphery elements 24, to thereby form in the formed component, any number of flow channels 31, (see FIGS. 4-5) communicating with one or a plurality of central flow channels 39. The formed component 100 which are angled and sized to operatively communicate with incoming or exiting conduits 33 or drains operatively communicating at the bottom of a maintenance shaft. Employing the system, there will be formed and stored a plurality of periphery elements 24 in a kit, each with different sized and positioned and angled channeled surfaces 18, to communicate with incoming or exiting conduits 33 or drains at any angle. A plurality of differently formed cores 12 are also formed and stored, to be engaged with any of the plurality of periphery elements 24, to communicate the incoming or exiting flow of fluid through one or a plurality of formed As a means to reduce weight and material employed, instead of solid components as would occur with concrete, support mount impressions 32 are employed on the remaining periphery elements, where, after thermoforming raw material, will engage with support elements (FIG. 9). Given the interchangeability of the components 18,24 of the device 10 and infinite number of possible arrangements of these components, those skilled in the art will appreciate the fact that to show all possible arrangements of these elements and possible flow channel configurations would require an infinite number of figures and pages which of course cannot be done. Therefor, only two such possible arrangements and configurations set forth in FIGS. 4 and 5 will be shown to convey the general scope of the device and its intended attributes.

Figure 4:
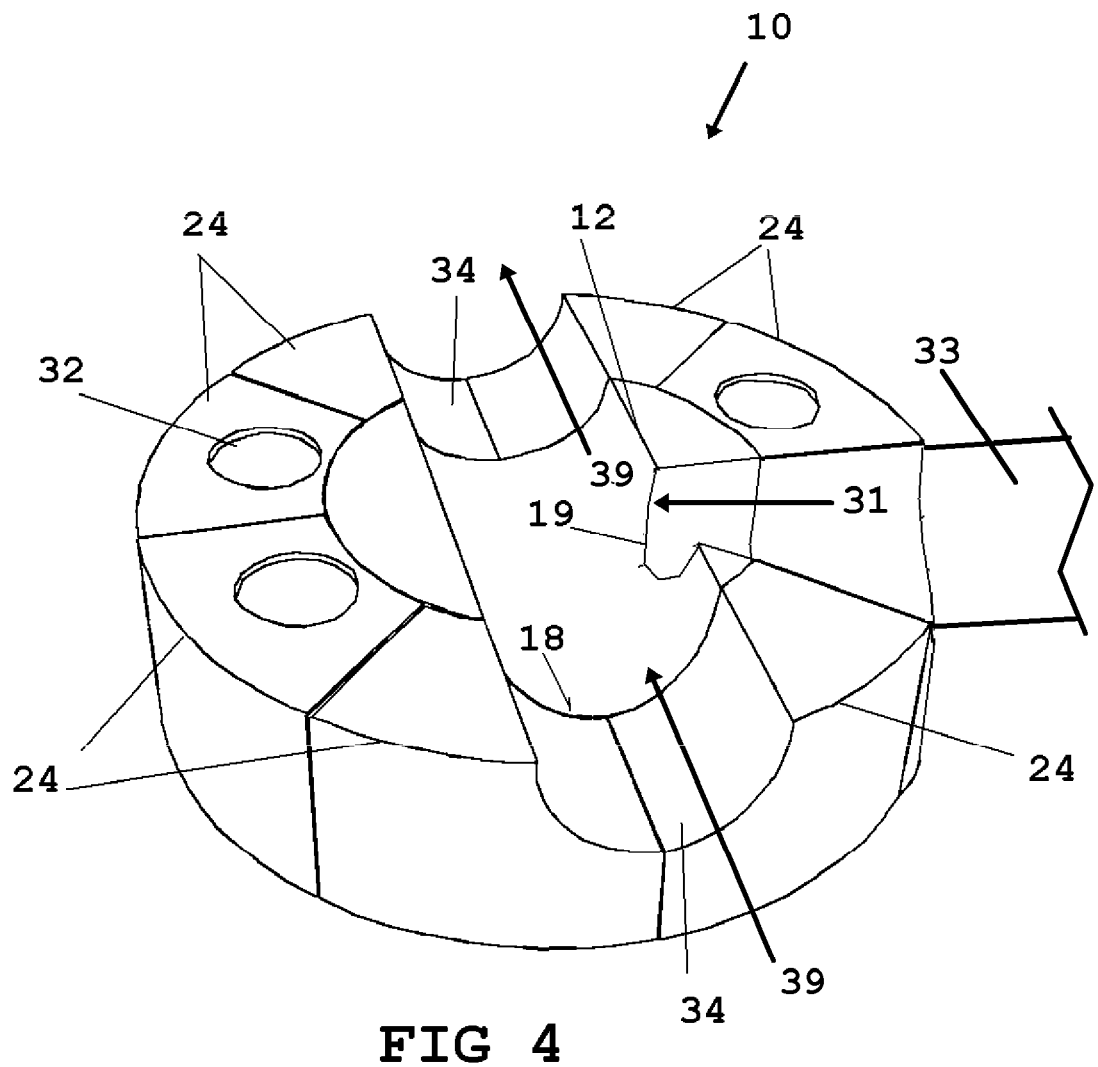
FIG. 4 shows a view of one of an infinite number of other modes of the device depicting two flow channels merging to one formed by substituting different periphery core elements from an inventory of differently formed periphery core elements.
Figure 5:
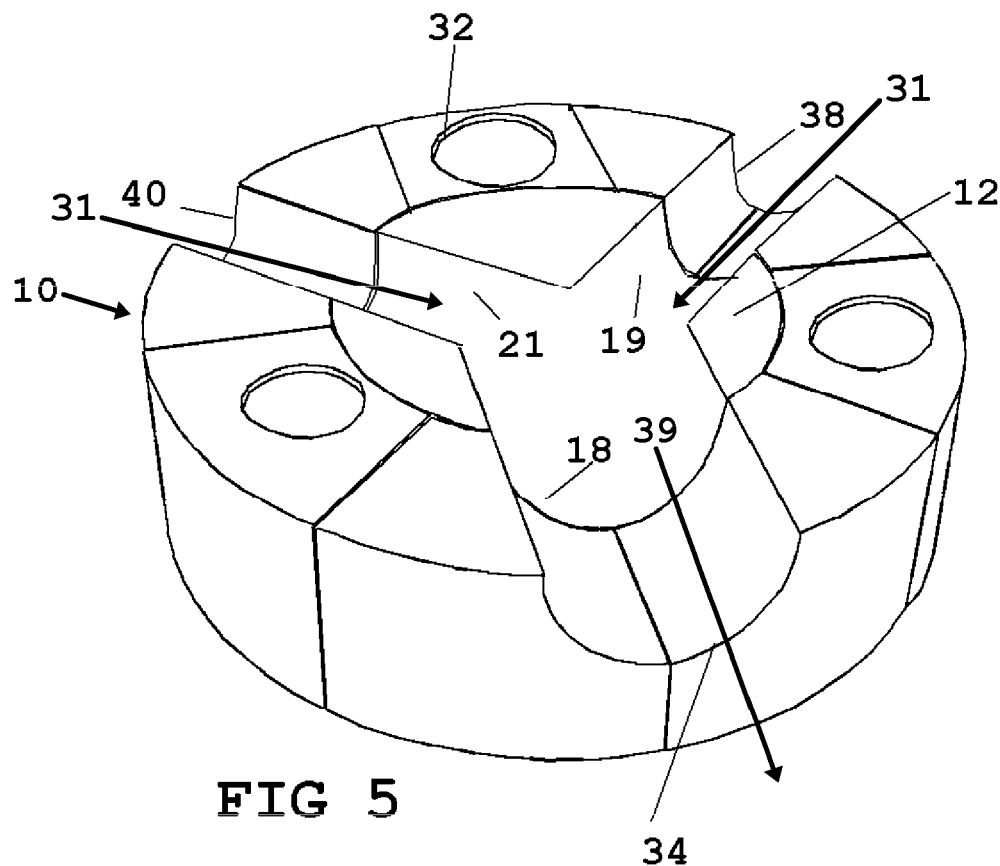
FIG. 5 shows yet another view of a second of an infinite number of modes of channel angling and formation the system provides and the finished device depicting one channel splitting to two.
Figure 10:
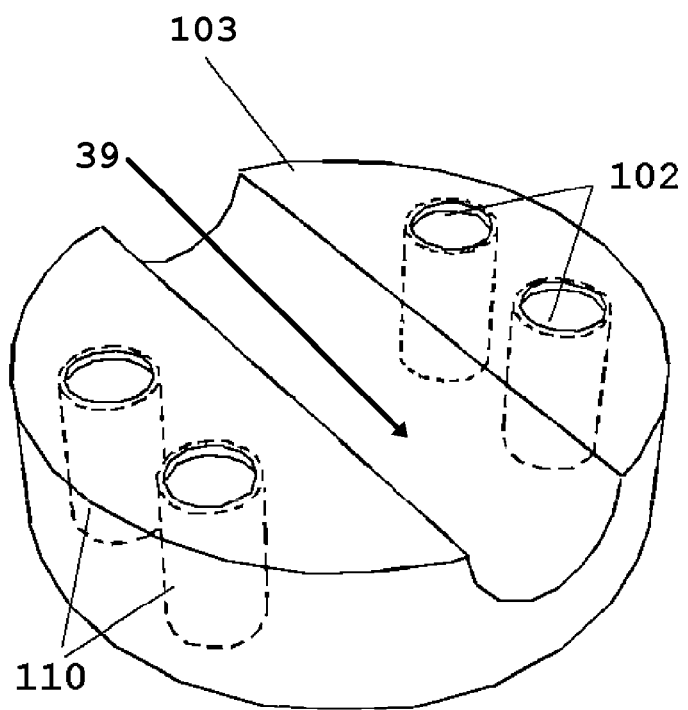
FIG. 10 is a view of one of an infinite number of finished thermoformed or rotationally molded base elements formed by the system herein.

In FIG. 4 the hub 12 employs a secondary flow channel 19 adapted to cooperatively engage in-line with the channel surface 36 of the respective periphery element 24. The full arrangement of the components of the device 10 shown in the figure provides a finished component with two flow channels merging to one central flow channel as shown in FIG. 10, but only depicts one of an infinite number of possible arrangements and configurations of the formed mold from the components. One other possible arrangement is seen in FIG. 5. Additional flow channels 18,19,21 within the core hub 12 engage cooperatively in-line with respective periphery elements 24 also employing channeled surfaces 38,40. This figure is a depiction of a formed mold to yield a finished component of one central flow channel 39 communicating with two 31 flow channels coming in at different angles relative to the axis of the central flow channel 39. For all configurations of the components of the mold for the system herein, to form a thermoforming or rotational mold to yield a maintenance hole base platform, the thermoforming process for example follows generally in the manner set forth in FIGS. 6-10. The molds yielded by the components would be handled in the same manner herein to form a mold for rotational molding to yield the finished component desired herein.

Figure 6:
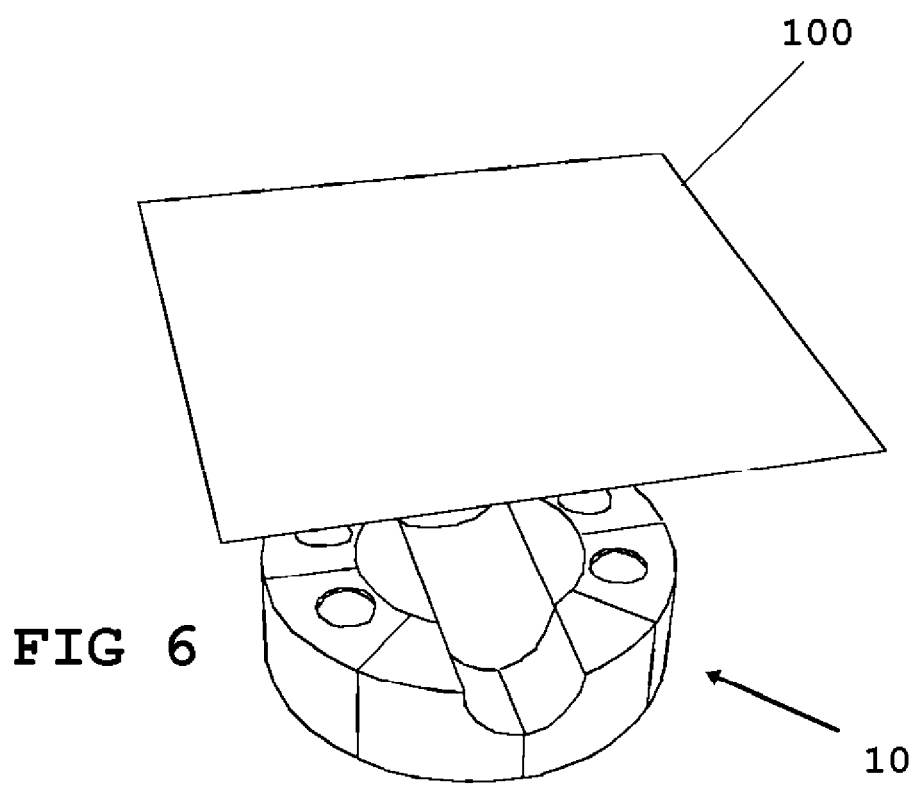
FIG. 6 shows formation of a component of device in its simplest mode using thermoforming raw polymeric material positioned over it.
Figure 7:
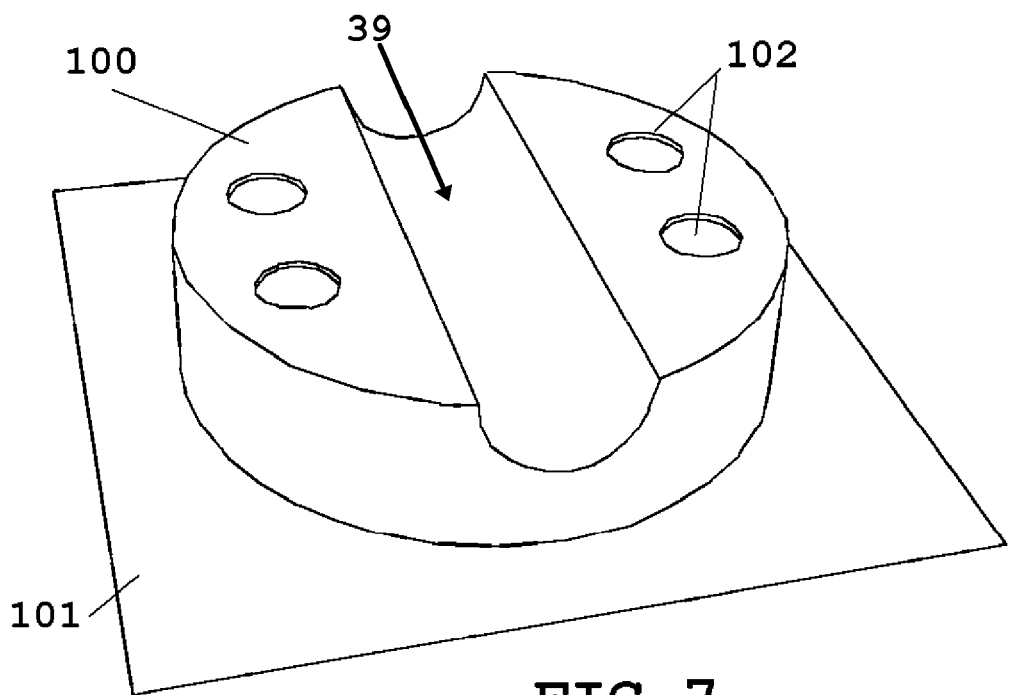
FIG. 7 shows a view with the planar polymeric material thermoformed about a component formed mold to form the shown channel and support mount with impressions formed therein from engagement to the mold.

FIG. 6 shows the polymeric material such as a plastic such as a polypropylene sheet 100 positioned over the formed mold device 10. Conventional to the thermoforming process, and to rotational molding, the material 100 is heated to be pliable and formed over the mold device 10 as depicted in FIG. 7.

Figure 8:
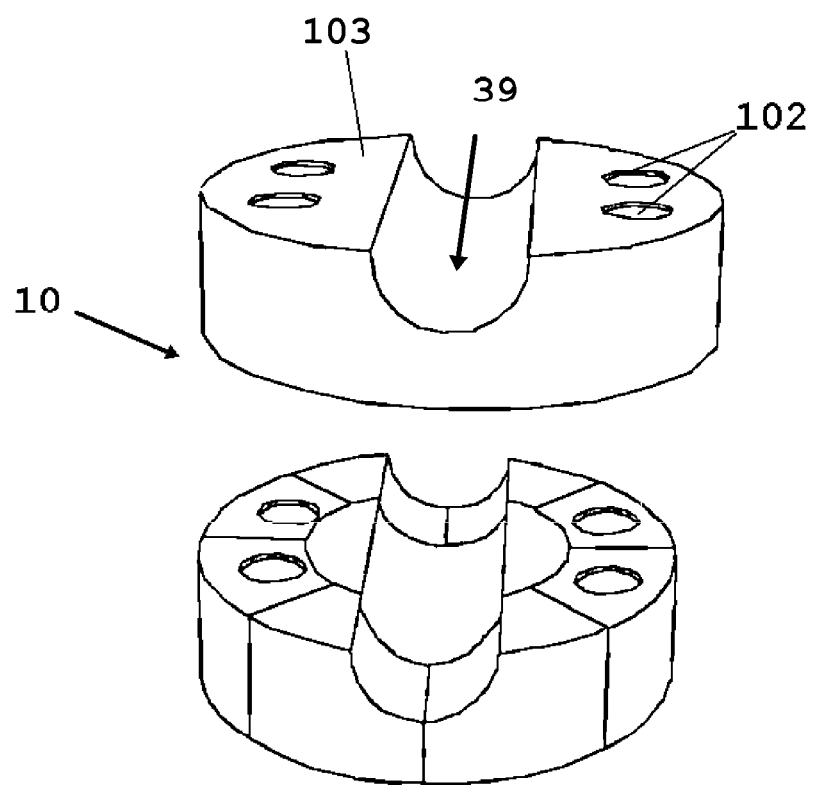
FIG. 8 is a view showing the newly formed maintenance hole base component disengaged from the device.

Support mount impressions 102 may be formed onto the material 100 using a mold device 12 adapted for such and thereby form the mount impressions 102 in the formed component 103 (FIG. 8). FIG. 8 also depicts the formed component 103 configured to the form of a maintenance hole base platform and removed from the formed mold of the hub and periphery components after conventional thermoforming or rotational molding of the polymeric material with the modular formed mold. Any formed flange 101 may be trimmed from the formed component 103 producing a seamless formed component 103 which is a copy of the virtual configuration defined by the CAD software which designated the proper central hub 12 and periphery components 24 to yield the desired formed component 103 with the desired number, size, and angle of the flow channels 31 and central flow channels 39 to fit the installation site intended at the bottom of a maintenance hole where conduits intersect a sewer or drain, or electrical system.

In order to maintain structural integrity of a formed base platform provided by the formed component 103 under weight thereon when installed, support elements 110 may be engaged to formed support mount impressions 102 on the underside of the formed component 103 as shown in FIG. 9. A formed component 103 providing a completed and supported maintenance hole base platform can be seen in FIG. 10 having a single central flow channel 39.

Figure 11:
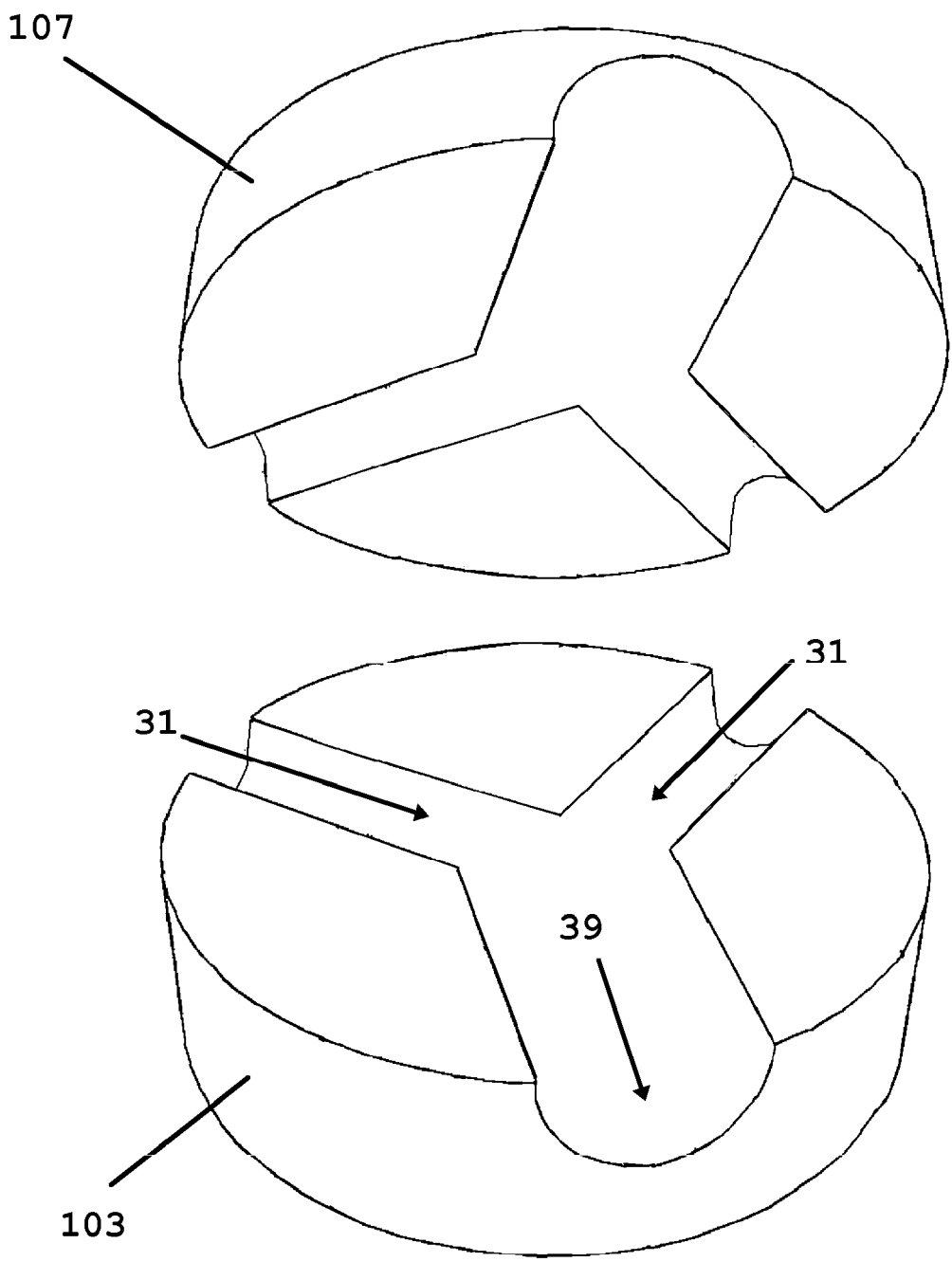
FIG. 11 depicts a mode of the system where the finished component is formed as both a base and cover to be employed for wire or fiberoptic conduits.

Molding to yield formed components 103 can also be performed to form junction boxes as in FIG. 11 for incoming conduits 33 which house fiber optic or electrical or communications cables. In such a mode, the formed component 103 may be rectangular or other shapes to fit the installation, and the formed central flow channels 39 and flow channels 31 would be angled, sized, and positioned, to operatively engage with such conduits 33. A custom cover plate 107, with mirrored central flow channels 39 and flow channels 31 would also be provided to be engaged abutting the formed component 103 to form sealed communications conduits for the cables or fiber optics cables through the device. This mode of the system herein would be especially useful in retrofit installations where old conduits are being rewired or repaired by allowing removal of existing junction boxes and custom formed easily installed finished components 103 which are then engaged to the old conduits using the properly sized, angled, and positioned central flow channels 39 and flow channels 31 and conduit pathways for the wiring or fiberoptic cable.

In a method employing the modular mold device 10 herein, measurements of conduits intended to engage a base component would be taken. From the measurements, using a CAD program having a virtual library of individual hub and periphery components each having different sized, angled, and positioned recesses, a virtual mold is configured to meet the requirements of the measurements.

Thereafter, the mold components identified in the assembled components from the library of virtual mold components is identified, and actual components assembled to a modular mold, Thereafter, a finished component is formed using the mold and polymeric materials to yield the formed finished base component for a maintenance shaft. If a conduit box is formed, a separate cover with mirrored conduit engagement passages is formed to mate to the finished component.

While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. A method for forming a maintenance hole base, the method comprising:

providing a first component having a top surface comprising at least one recess;

providing a plurality of second components, the second components being configured to engage with the first component and thereby form a mold, wherein at least one of the second components has a top surface comprising at least one recess configured to align with the at least one recess of the first component so as to at least partially define at least one channel in the mold; and providing a polymeric material configured to be molded against the mold.

2. The method of claim 1, wherein the first component has a side surface, the side surface having a substantially circular cross-sectional shape.

3. The method of claim 1, wherein the second components are configured to cooperate with one another to surround the first component.

4. The method of claim 1, wherein the first component comprises a first interengaging structure and the second components each comprise a second interengaging structure, the first interengaging structure being configured to engage with the second interengaging structure.

5. The method of claim 4, wherein the first interengaging structure comprises a tab and the second interengaging structure comprises a slot.

6. The method of claim 1, wherein the second components are configured to removably engage with the first component.

7. The method of claim 1, wherein
providing the first component comprises selecting the first component from a virtual library, and wherein
providing the second components comprises selecting the second components from a virtual library.

8. The method of claim 1, further comprising:
molding the material against the mold; and
removing the molded material from the mold to produce a maintenance hole base having at least one channel.

9. The method of claim 1, wherein at least one of the second components has a top surface comprising at least one recess defining the shape of a mounting boss.

10. The method of claim 9, further comprising:
molding the material against the mold; and
removing the molded material from the mold to produce a maintenance hole base having at least one channel and at least one mounting boss.

11. The method of claim 10, further comprising:
mounting a support to the maintenance hole base in the region of the mounting boss.

12. The method of claim 1, wherein the at least one channel has a linear configuration.

13. The method of claim 1, wherein the at least one channel has a Y-configuration.

14. The method of claim 1, wherein the molding comprises thermoforming.

15. The method of claim 1, wherein the molding comprises rotational molding.

* * * * *